United States Patent [19]
Tornero

[11] Patent Number: 5,238,514
[45] Date of Patent: Aug. 24, 1993

[54] METHOD FOR FORMING A CUSHION

[76] Inventor: Roger Tornero, 6117 Ballinger Rd., Greensboro, N.C. 27410

[21] Appl. No.: 840,119

[22] Filed: Feb. 24, 1992

[51] Int. Cl.⁵ .................. B29C 43/02; B32B 31/20
[52] U.S. Cl. ........................... 156/196; 156/216; 156/245; 264/241; 264/259
[58] Field of Search ............... 156/196, 216, 219, 220, 156/221, 245, 285; 264/241, 254, 257, 250, 255, 259, 263, 271.1

[56] References Cited

U.S. PATENT DOCUMENTS 3,325,329  6/1967  Bolesky .................. 156/216
5,000,805  3/1991  Lowe ..................... 156/285

Primary Examiner—Caleb Weston

[57] ABSTRACT

A process provides an improved seat cushion for use in upholstered chairs or the like having a smooth, uniform shape and which eliminates unsightly underlines. A thick foam block is attached to a thin, rigid base and the assembly is placed in a mold whereby a thin foam cover is adhered to the foam block and to the outer edges of the base to produce a precisely contoured cushion which can be upholstered and fitted into a desired chair frame.

5 Claims, 2 Drawing Sheets

METHOD FOR FORMING A CUSHION

BACKGROUND OF THE INVENTION

1. Field of the Invention

The present invention pertains to the formation of seat cushions and particularly to forming a cushion for an upholstered chair seat or the like.

2. Description of the Prior Art and Objectives of the Invention

Polyurethane foam and other resilient materials have been used for seat cushions for many years in the upholstered furniture industry. Various dimensioned and density foam blocks are cut and covered with fabric to form seat cushions for sofas, chairs and other furniture. Additionally, chair and sofa frames are likewise often partially wrapped with resilient foam prior to covering with a desired fabric to achieve the desired contours and appearance. In the cost conscious furniture industry it has been lately the practice to preassemble foam covered components at various shops which are assembled at a central plant to expedite the manufacturing process. For example, upholstered chair manufacturers may contract through "outside" sources to purchase a partial chair seat assembly consisting of a wooden base having a contoured foam block glued thereto. The furniture maker after receiving this partial seat assembly and covers it with a fabric and subsequently attaches it to a finished chair frame. A large number of such partial seat assemblies may be kept on hand by the furniture manufacturer so changes to the fabric type or style can be quickly made depending on the customer's needs. While such partial seat assemblies can be made to exact standards, concerns and uniformity problems arise as the partial seat assembly is subject to an individual upholsterer's ability to correctly tension and attach the fabric cover and any additional layers prior to fixing the fabric cover thereto. The final steps in the chair production are subject to the particular craftsman's skills and oftentimes by applying too little or too much manual pressure during attachment of the fabric covering, an unacceptable product results. This oftentimes occurs along the upper contours and crown at the top of the seat.

With the known disadvantages and problems associated with the prior art seat cushion assemblies, the present invention was conceived and one of its objectives is to provide a partial seat cushion assembly which will allow the manufacturer to produce an attractive, uniform and consistent seat on each chair manufactured.

It is another objective of the present invention to provide a partial seat assembly which will allow the upholsterer ease and convenience in covering the cushion.

It is still another objective of the present invention to provide a seat cushion which has no unsightly underlines and which is contoured evenly throughout.

It is yet another objective of the present invention to provide a method for forming a seat cushion in which a plurality of synthetic foam components are attached to a rigid base to form a smooth, even crown throughout.

It is still another objective of the present invention to provide a method for forming a seat cushion whereby a mold is used to insure uniformity in the crown.

It is still another objective of the present invention to provide a seat cushion from the process as described above.

Various other objectives and advantages of the present invention become apparent to those skilled in the art as a more detailed presentation is set forth below.

SUMMARY OF THE INVENTION

The invention herein pertains to a method for forming a cushion for a chair seat or the like and the product formed therefrom. The method comprises affixing a foam block to a planar base by gluing or the like while subjecting the device to pressure such as from a hydraulic ram within a mold. Next, a thin foam covering is attached to the top of the foam block and pressure is again applied to insure contact and proper contour of the foam. The thin foam cover is then urged against the edges of the planar base while the cover is being attached to the base. Afterwards the extending ends of the foam cover are trimmed and a partial seat cushion is then provided which can be upholstered with the desired fabric for later installation into a chair frame.

BRIEF DESCRIPTION OF THE DRAWINGS

The drawings are provided to help explain the invention whereby.

DESCRIPTION OF THE PREFERRED EMBODIMENT

Figure 1:
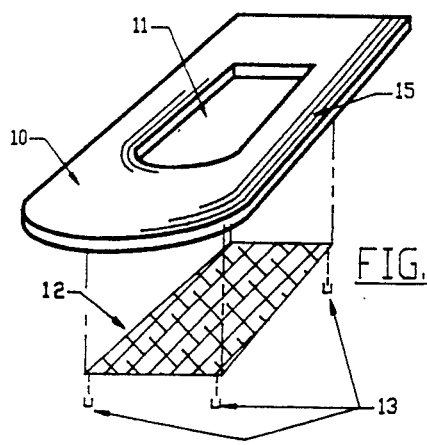
FIG. 1 illustrates a conventional upholstered chair seat base with the fabric center exploded therefrom.
Figure 2:
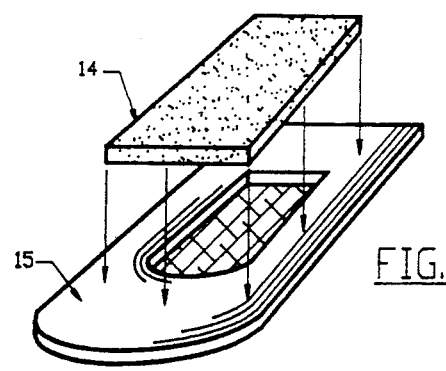
FIG. 2 demonstrates the planar seat base prior to affixing a first small foam block thereto.
Figure 3:
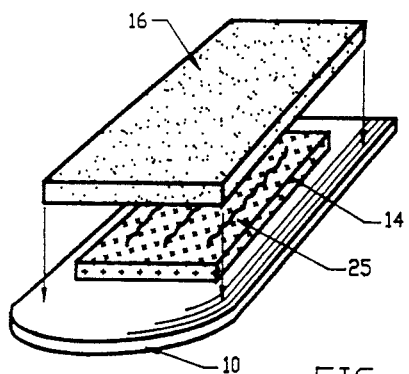
FIG. 3 illustrates a larger outer foam block prior to attachment to the smaller block.
Figure 4:
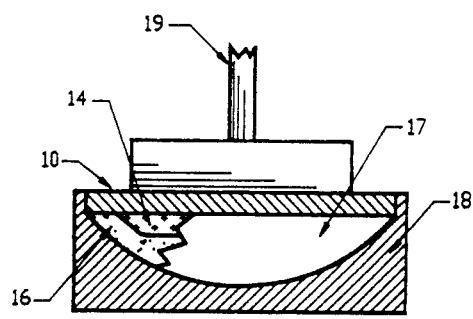
FIG. 4 depicts the assembly as shown in FIG. 3 placed in a mold with pressure applied thereto whereby the outer foam block conforms to the mold and the extending ends of the outer foam block are attached to the planar base.
Figure 5:
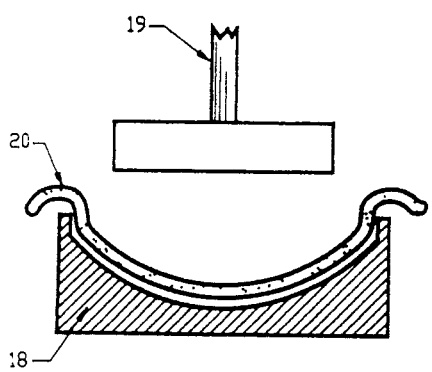
FIG. 5 shows a thin foam covering positioned in a mold.
Figure 6:
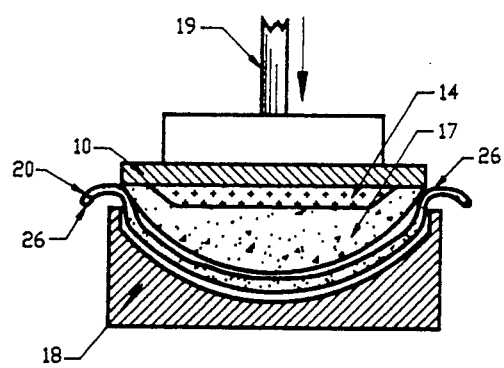
FIG. 6 features the partial seat cushion assembly as shown in FIG. 4 placed in the mold against the thin foam covering with pressure being applied thereto.

The preferred process of the invention is illustrated in FIGS. 1-7 whereby a seat-shaped planar base formed from one-half inch thick pressed board is attached to a small, somewhat rectangular one inch thick relatively high density polyurethane foam block (FIG. 3). Postioned thereover for attachment by a suitable adhesive is a thicker (1¼") relatively low density polyurethane foam block which will form a three layer assembly. The assembly is then inverted and placed in a mold whereby pressure from a ram forces the outer block to conform to the inner mold contour while the ends of the outer block which extend beyond the inner foam block are adhered to the planar base with the assistance of suitable adhesive. Next, a thin urethane foam covering which may be for example, one-quarter of an inch thick is placed in the mold and the previously formed assembly of FIG. 4 is positioned on top thereof with suitable adhesive therebetween. The thin covering is adhered to the outer block and is forced thereagainst by a hydraulic ram (FIG. 6). The thin foam cover conforms to the mold configuration as it adheres to the outer foam block. Next, the ends of the thin foam covering are urged against the edges of the planar base (FIG. 7) and an adhesive likewise secures the foam covering to the base edges. The ends of the foam covering are then trimmed and the partial seat cushion assembly which results therefrom (FIG. 8) is smooth, uniform and ready for fabric covering and attachment to a chair frame.

DETAILED DESCRIPTION OF THE DRAWINGS AND OPERATION OF THE INVENTION

For a more complete understanding of the invention and the process involved, turning now to the drawings, FIG. 1 illustrates a conventional chair seat base 10 as is used in upholstered furniture chairs. Base 10 comprises a relatively rigid, planar one-half inch thick plywood, composite board, or it may be formed from other suitable materials. Opening 11 therein provides for a lighter weight base and is covered from underneath by fabric webbing 12. Staples 13 hold webbing 12 onto the bottom of base 10. In FIG. 2, small polyurethane foam block 14 is attached to the upper surface 15 of planar base 10 by glue or by other means as suitable. Foam 14 is the smaller of a two part resilient layer as will be explained herein to achieve a soft, comfortable effect to the completed seat assembly. In FIG. 3, the outer layer is shown prior to attachment whereby outer foam block 16 is larger than foam block 14 and will extend therebeyond when attached to block 14. Small foam block 14 may be for example, one inch thick whereby larger outer block 16 may be for example, one and one-quarter inches thick. Also, the load bearing deflection values of smaller block 14 may be for example, forty to fifty percent (40-50%) greater than outer block 16. As is well known by those skilled in the chair manufacturing art, it is conventional to affix a foam block to a planar seat base and therefore the steps of the invention as illustrated in FIGS. 1 and 2 are old and conventional. Likewise, it is conventional in the furniture trade to "mix" the density of foam blocks in forming cushions, however the steps as shown in FIGS. 4-8 are new and nonconventional and provide an improved partial assembly.

Figure 7:
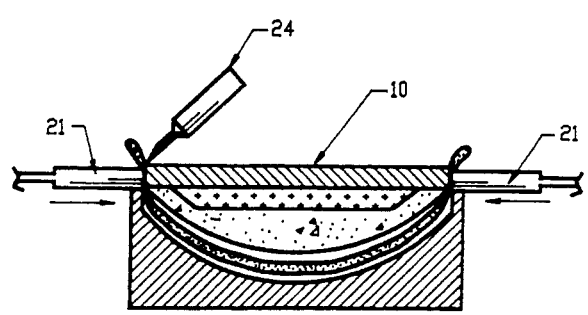
FIG. 7 pictures the edges of the planar member with pressure urged against the thin foam covering for attachment thereto.
Figure 8:
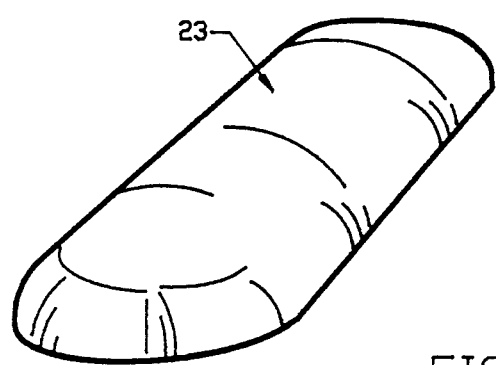
FIG. 8 presents the product formed from the process of the steps in FIGS. 1-7.

In FIG. 4, larger block 16 of the seat cushion construction is brought to an exact outer conformity by placing assembly 17 within mold 18 whereupon the extending ends of outer block 16 are folded over the edges of smaller foam block 14 for adherence by a suitable adhesive to planar base 10. A quick set, hot melt or other adhesives or fasteners as desired may be used. Partial assembly 17 is then removed from mold 18 and a thin, medium density polyurethane foam cover 20 which may be for example, one-quarter of an inch thick is placed within mold 18 as shown in FIG. 5. Next, partial assembly 17 is placed within mold 18 upside down against cover 20 as shown in FIG. 6 and pressure by ram 19 is then applied to the bottom of base 10. Ram 19 presses against base 10 and urges partial assembly 17 against cover 20 after application therebetween of a suitable adhesive. Thus, partially assembly 17 is adhesively secured to cover 20 while ram 19 maintains base 10 and partial assembly 17 within mold 18. Next, base outer edges 22 and 22' as shown in FIG. 6 are coated with an adhesive and the free ends 26, 26' of cover 20 are urged against base edges 22, 22' as shown in FIG. 7. As would be understood, all of the four ends of cover 20 are forced against the outer edges of planar base 10 and the figures herein show only two edges in cross-sectional view for clarity. Horizontal ram members 21, 21' (shown schematically) may also be controlled by hydraulic or mechanical pressure as is vertical ram 19 and apply a horizontal force against base 10. As seen in FIG. 7, ends 26, 26' of cover 20 are lastly trimmed by knife 24 or the like to thereby complete the formation of partial seat cushion assembly 23 as shown in FIG. 8 with base 10 covered with the exception of its bottom surface. Cushion assembly 23 as completed is now available for covering with a fabric or for other treatment prior to incorporation into a chair frame.

The method as shown herein provides a high production capacity while allowing the densities of the seat cushions to be easily varied. The outer shape of finished assembly 23 is consistent from cushion to cushion due to the shape of mold 18. The method as described herein reduces operator fatigue and the possibility of carpal tunnel syndrome of the workers.

As would be understood, other shapes and types of cushions can likewise be formed from processes shown herein using different materials and the illustrations and examples are used for explanatory purposes and are not intended to limit the scope of the appended claims.

I claim:

1. A method of forming a seat cushion comprising the steps of:
   (a) attaching a small resilient foam block to a rigid planar base;
   (b) attaching a larger resilient foam block over the small foam block, whereby ends of the larger foam block extend over said small foam block;
   (c) attaching the extending foam block ends beyond the small foam block to the planar base;
   (d) partially placing a thin resilient foam cover into a mold while allowing the edges of the cover to extend therefrom;
   (e) thereafter placing the planar base, larger foam block and small foam block into the mold with the large foam block against the thin resilient foam cover;
   (f) attaching the resilient foam cover to said large resilient foam block;
   (g) urging the thin resilient foam cover against the edges of said planar base; and
   (h) adhesively attaching the cover against said planar base edges to form a seat cushion.

2. The method of claim 1 and including the step of trimming the edges of the foam cover coincidentally with the edges of the planar base.

3. The method of claim 1 and including the step of applying pressure to said planar member while said large block is in contact with said foam cover.

4. A method of forming a cushion for a chair seat or the like comprising the steps of:
   (a) forming a rigid planar base having thin edges;
   (b) placing a smaller resilient foam block to said base whereby the outer edges of said base extend beyond said foam block;
   (c) placing a larger resilient foam block atop said smaller foam block whereby the ends of said larger foam block extend beyond said smaller foam block;
   (d) pressing the ends of the larger foam block against the base;
   (e) attaching the ends of said larger foam block to said base to form a cushion construction;
   (f) partially placing a thin resilient foam cover in a mold while allowing the edges to extend therefrom;

(g) thereafter placing said larger foam block against said foam cover within said mold;
(h) applying pressure to said planar base while attaching said cover to said large foam block;
(i) thereafter pressing said resilient cover against said planar base outer edges; and next
(j) attaching said resilient cover to said base outer edges.

5. The method of claim 4 wherein attaching said cover to said edges comprises gluing said cover to said edges.

* * * * *